United States Patent [19]
Kitajima

[11] Patent Number: 5,937,100
[45] Date of Patent: Aug. 10, 1999

[54] TWO-PASS IMAGE PROCESSING METHOD AND APPARATUS USING VIRTUAL ESTIMATION FOR COMPRESSED FILE SIZE

[75] Inventor: Tatsutoshi Kitajima, Kodaira, Japan

[73] Assignee: Ricoh Company, Ltd., Tokyo, Japan

[21] Appl. No.: 08/806,258

[22] Filed: Feb. 21, 1997

[30] Foreign Application Priority Data

Feb. 29, 1996 [JP] Japan ................................. 8-043642
Feb. 4, 1997 [JP] Japan ................................. 9-021708

[51] Int. Cl.$^6$ ............................. G06K 9/36; G06K 9/38; G06K 9/46
[52] U.S. Cl. ...................... 382/251; 382/239; 358/261.2; 358/430; 348/405
[58] Field of Search ................................. 358/430, 432, 358/433, 426; 382/239, 251; 348/231, 405, 419, 404, 387, 390

[56] References Cited

U.S. PATENT DOCUMENTS

| | | | |
|---|---|---|---|
| 5,146,324 | 9/1992 | Miller et al. | 358/133 |
| 5,241,383 | 8/1993 | Chen et al. | 358/136 |
| 5,249,053 | 9/1993 | Jain | 358/209 |
| 5,479,210 | 12/1995 | Cawley et al. | 348/390 |
| 5,621,820 | 4/1997 | Rynderman et al. | 382/239 |
| 5,757,434 | 5/1998 | Gunnewiek et al. | 348/405 |
| 5,781,237 | 7/1998 | Fukuda | 348/405 |

FOREIGN PATENT DOCUMENTS 4-87472 3/1992 Japan .
4-233373 8/1992 Japan .

*Primary Examiner*—Amelia Au
*Assistant Examiner*—F. E. Cooperrider
*Attorney, Agent, or Firm*—Oblon, Spivak, McClelland, Maier & Neustadt, P.C.

[57] ABSTRACT

An image processing method and an image processing apparatus in which a DCT section transforms image data to a frequency conversion coefficient using a discrete cosine transform coefficient, a quantizing section quantizes the transformed frequency conversion coefficient using a quantization coefficient indicating weighing in quantization, a Huffman encoding section encodes the quantized data, and a CPU detects a code rate for encoded data by a prespecified time interval during execution of processing for encoding the data quantized by the encoding means and changes the quantization coefficient during processing for encoding according to the detected code rate.

9 Claims, 6 Drawing Sheets

TWO-PASS IMAGE PROCESSING METHOD AND APPARATUS USING VIRTUAL ESTIMATION FOR COMPRESSED FILE SIZE

FIELD OF THE INVENTION

The present invention relates to an image processing method and an image processing apparatus for a digital camera or the like, and more particularly to an image processing method and an image processing apparatus in which data for an object image is processed for encoding into a fixed length target file.

BACKGROUND OF THE INVENTION

The JPEG system based on the conventional technology which is a standard system for compressing still images employed in an image processing apparatus for a digital camera or the like is a compression system for encoding with variable length, and for this reason in some object a generated code rate obtained after compression may vary.

On the other hand, as an object image compression system for an image processing apparatus for a digital camera or the like, it is required to inform an operator of the number of sheets of object image which can be photographed with a remaining memory space by displaying it or the like, so that it is necessary to carry out processing for encoding into a fixed length target file to reduce a memory space used for a piece of object image, namely a generated code rate for a sheet of object image to a prespecified value or less.

As described above, in a case where the JPEG is employed for the image processing apparatus for a digital camera or the like, in the JPEG, object image data is subjected to two-dimensional DCT (Discrete Cosine Transform) by each block unit comprising 8×8 pixels to transform it to a DCT coefficient which is a frequency element. Quantized data with this DCT coefficient weighted weights to the low frequency element is transformed to Huffman code by means Huffman encoding, which is encoding with variable length. The Huffman encoding is executed in a block on the previous screen and a finally generated code rate is computed.

In a case where the finally generated code rate exceeds the prespecified rate described above, the number of sheets of object image which can be photographed varies. On the other hand, if the finally generated code rate is too small, the number of sheets of image which can be photographed with a remaining memory space does not become different from the estimated number of sheets of image, but the image quality of the object image becomes excessively lower.

To solve the problem described above, processing for encoding into a fixed length target file for equalizing a finally generated code rate to a prespecified rate is carried out. As a method of encoding into a fixed length target file, there is a method in which an entire screen is compressed over a plurality of times by changing a scale factor value "Q" for uniformly dividing image data to obtain a different quantization table or a coefficient of the quantization table and by computing an optimal control coefficient by repeating the compression processing until the generated code rate enters the range of the prespecified rate (e.g. "Image processing apparatus" disclosed in Japanese Patent Laid-Open Publication No. HEI 4-233373).

As another way of processing for encoding into a fixed length target file, there is a method of providing a plurality of encoding devices for subjecting inputted object image data to different processing for encoding and selecting an optimal result from encoded results provided by the encoding devices respectively (e.g. "Image processing apparatus" disclosed in Japanese Patent Laid-Open Publication No. HEI 4-87472).

However, among the methods of processing for encoding into a fixed length target file based on the conventional technology, especially in the method of processing for encoding into a fixed length target file executed with the former image processing apparatus, it takes an extremely and disadvantageously long period of time to execute compression processing for many times by changing a control coefficient to the entire image screen.

Also, the method of processing for encoding with fixed length target file executed by the latter image processing apparatus, provision of a plurality of encoding devices increases cost of the entire devices although a time required for processing for encoding can be reduced.

SUMMARY OF THE INVENTION

It is an object of the present invention to provide an image processing method and an image processing apparatus in which an optimal quantization coefficient (determining a compression ratio value) is obtained according to compression of the entire image screen at one time and high-speed processing for encoding into a fixed length target file is executed according to the obtained quantized coefficient (determining compression ratio value) in a single encoding device.

Hereafter, the expression "code rate" signifies an amount of data. In the image processing method according to the present invention, image data is compressed using a compression ratio value for changing a compression ratio, a compressed code rate in data compression is detected, and a condition for a compression ratio value is changed according to the detected code ratio value even during compression of one image screen, so that an optimal compression ratio value can be obtained by compressing the entire image screen at one time, and high-speed processing for encoding into a fixed length target file can be carried out, which makes it possible to reduce a time required for the processing for encoding into a fixed length target file.

In the image processing apparatus according to the present invention, the data compressing means compresses image data using a compression ratio value for changing a compression ratio, the compressed code rate detecting means detects a compressed code rate in data compression, and the condition changing means changes a condition for a compression ratio value according to the detected code rate value even during compression of one image screen, so that an optimal compression ratio value can be obtained by compressing the entire image screen at one time in the single encoding device, and high-speed processing for encoding into a fixed length target file can be carried out, which makes it possible to reduce a time required for the processing for encoding into a fixed length target file as well as to reduce cost of the entire apparatus.

In the image processing method according to the present invention, image data is transformed to a frequency conversion coefficient using a discrete cosine transform coefficient, the transformed frequency conversion coefficient is quantized using a quantization coefficient indicating weighing in quantization, quantized data is encoded, a code rate for encoded data is detected by a prespecified time interval during the processing for encoding, and the quantization coefficient is changed during execution of the processing for encoding according to the detected code rate, so that an optimal quantization coefficient can be obtained by compressing an entire image screen at one time, and high-speed processing for encoding into a fixed length target file can be executed, which makes it possible to reduce a time required for the processing for encoding into a fixed length target file.

In the image processing apparatus according to the present invention, the discrete cosine transform (DCT) means transforms image data to a frequency conversion coefficient using a discrete cosine transform coefficient, the quantizing means quantizes a frequency conversion coefficient transformed by the discrete cosine transform means using a quantization coefficient indicating weighing in quantization, the encoding means encodes data quantized by the quantizing means, the code rate detecting means detects a code rate for encoded data by a prespecified time interval during execution of the processing for encoding the quantized data by the encoding means, and the quantization coefficient changing means changes the quantization coefficient during processing for encoding according to the code rate detected by the code rate detecting means, so that an optimal quantization coefficient can be obtained by compressing an entire image screen at one time in a single encoding device, and high-speed processing for encoding into a fixed length target file can be executed, which makes it possible to reduce a time required for the processing for encoding into a fixed length target file as well as to reduce cost of the entire apparatus.

Other objects and features of this invention will become understood from the following description with reference to the accompanying drawings.

DESCRIPTION OF THE PREFERRED EMBODIMENTS

Figure 1:
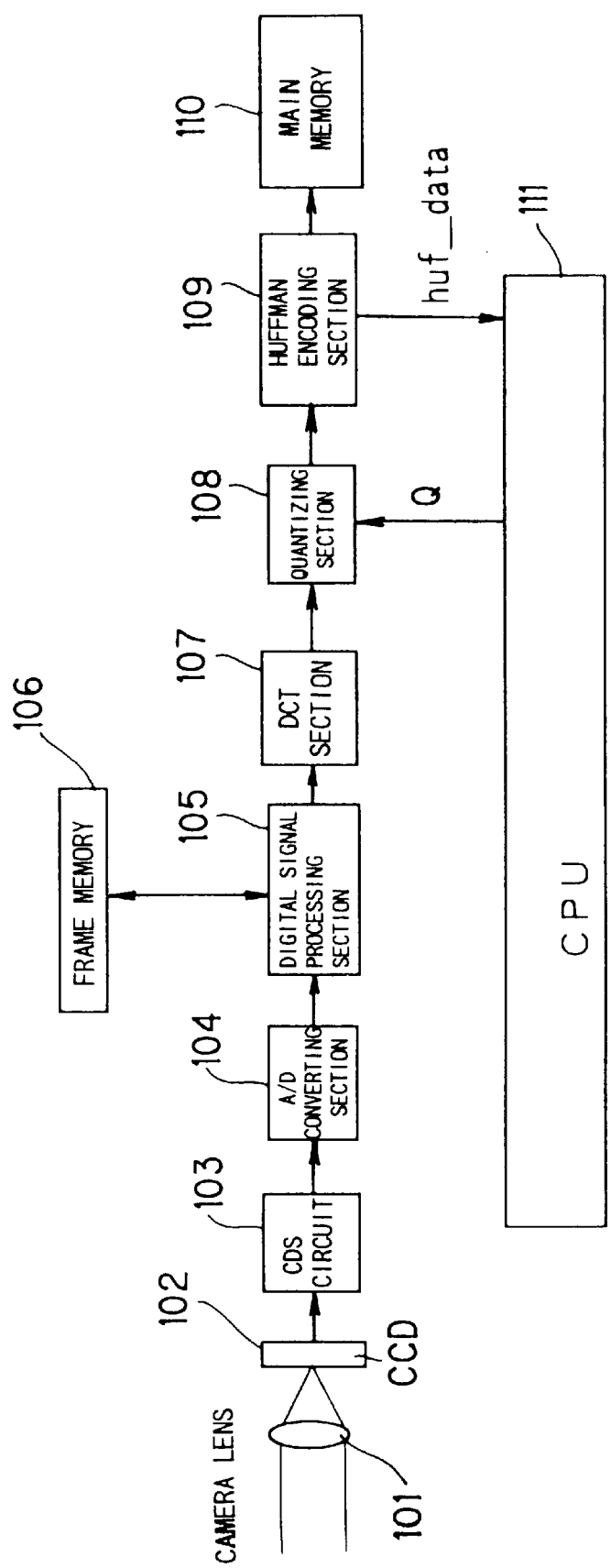
FIG. 1 is a block diagram showing basic configuration of an image processing apparatus according to Embodiment 1 of the present invention.

Detailed description is made for the image processing method and the image processing apparatus according to embodiments of the present invention with reference to the related drawings. At first, description is made for basic configuration of the image processing apparatus according to Embodiment 1. FIG. 1 is a block diagram showing basic configuration of the image processing apparatus according to Embodiment 1. In the figure, designated at the reference numeral 101 is a camera lens, at 102 a CCD (Charge Coupled Device), at 103 a CDS (Correlated Double Sampling) circuit, at 104 an A/D (Analog/Digital) converting section, at 105 a digital signal processing section, at 106 a frame memory, at 107 a DCT (Discrete Cosine Transform) section, at 108 a quantizing section, at 109 a Huffman encoding section, at 110 a main memory, and at 111 a CPU (Central Processing Unit).

The camera lens 101 is a lens for photographing an object image. The CCD 102 is an image pick-up device for exposing the object image photographed by the camera lens 101 by converting light energy to an electric signal, and the CDS circuit 103 is a circuit for reducing noise of the CCD 102.

The A/D converting section 104 is a changing section for converting the object image which is an analog image exposed by the CCD 102 to a digital image.

The digital signal processing section 105 is a processing section for executing various types of processing such as processing for color-conversion of the digital image converted by the A/D converting section 104.

The frame memory 106 is a memory for storing therein digital image signals subjected to various types of processing in the digital signal processing section 105.

The DCT section 107 is a transforming section for subjecting the digital image signal stored in the frame memory 106 to the two-dimensional discrete cosine transform by a block unit comprising 8×8 pixels and transforming the digital image signal to a DCT coefficient which is a two-dimensional frequency element.

The quantizing section 108 quantizes the DCT coefficient by multiplying the DCT coefficient transformed by the DCT section 107 by a quantization coefficient (determining a compression ratio) value. Herein, the quantization coefficient (determining the compression ratio) value is obtained by dividing a quantization table value which becomes a basis of quantization by a scale factor value "Q" set by the CPU 111. As described above, a generated code rate after quantization (compression) executed by the quantizing section 108 is controlled by changing setting of the scale factor value "Q".

The Huffman encoding section 109 is an encoding section for Huffman-encoding quantized data for the DCT coefficient quantized (compressed) by the quantizing section 108. Also the Huffman encoding section 109 detects continuously a generated code rate of the Huffman-encoded data when the quantized data for the DCT coefficient is to be Huffman-encoded, and holds the generated code rate as data for "huf_data".

The main memory 110 is a memory for storing therein data encoded by the Huffman encoding section 109.

The CPU 111 controls the sequence by controlling each of the component sections 101 to 110 and at the same time executes processing for encoding into a fixed length target file. More specifically, the CPU 111 calls up data for "huf_data", at a prespecified cycle, indicating a generated code rate for the Huffman-encoded data from the Huffman encoding section 109, and sets a scale factor value "Q" according to the called-up generated code rate. Furthermore, the CPU 111 sends out the set scale factor value "Q" to the quantizing section 108 to change the quantization coefficient (changing the compression ratio).

Figure 2:
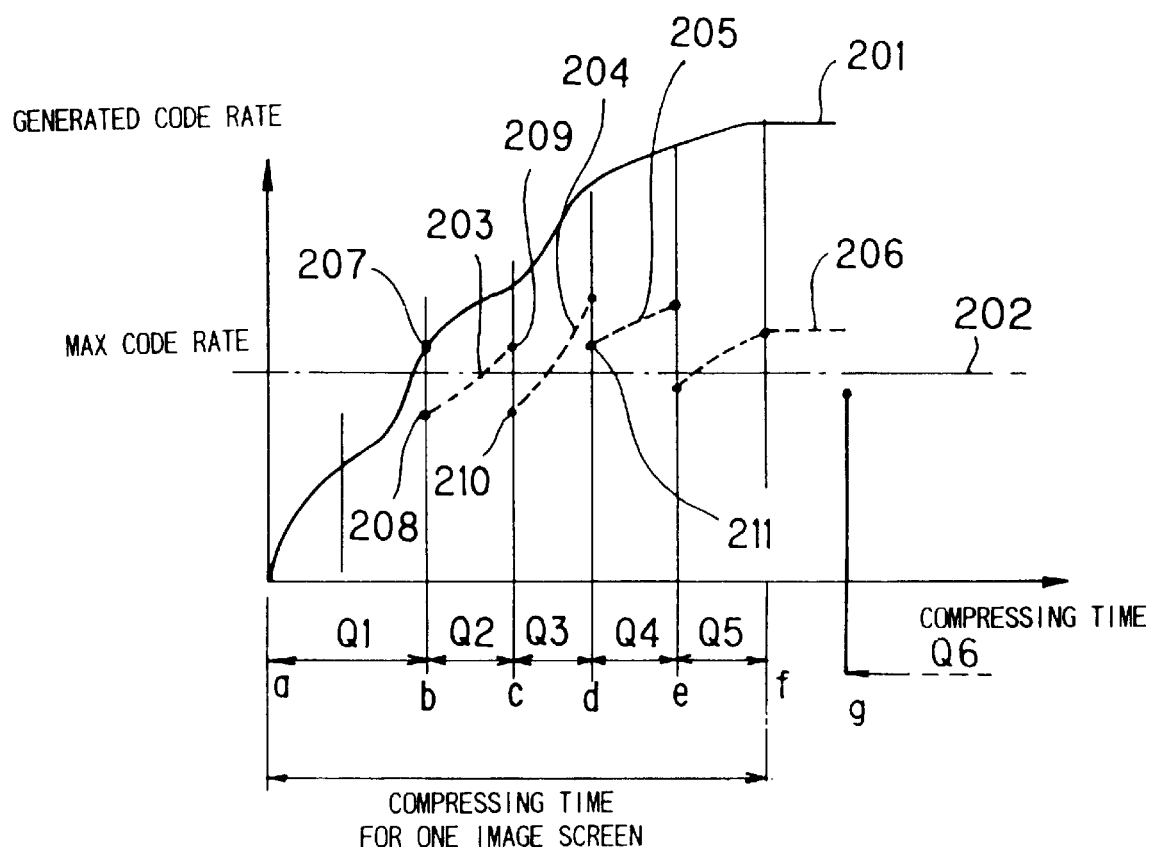
FIG. 2 is an explanatory view showing a relation between a compressing time required for image compression of one image screen and a generated code rate.

Next description is made for control of a generated code rate for the Huffman-encoded data in the Huffman encoding section 109. FIG. 2 is an explanatory view showing a relation between a scale factor value "Q" to a compressing time required for image compression of one image screen and a generated code rate. In the figure, the horizontal axis indicates a compressing time required for compressing one image screen and the vertical axis indicates a generated code rate.

"Q1" to "Q6" in the horizontal axis indicate scale factor values respectively and also indicate the fact that compression is executed according to a compression ratio for each of the scale factor values in a period when the scale factor value is shown. In the scale factor values "Q1" to "Q6", "Q1" is a scale factor value for the lowest compression ratio, the compression ratio increases in the order of "Q2", "Q3" . . . , and "Q6" is a scale factor value for the highest compression ratio.

Herein, a curve 201 indicated by a solid line indicates an actually generated code rate in a case where data is encoded according to the compression ratio for the scale factor value "Q1", a dashed straight line 202 in parallel with the horizontal axis indicates a MAX code rate showing an upper limit of a generated code rate, and dotted curves 203 to 206 indicate virtual code rates in a case where the scale factor values "Q2" to "Q5" are used respectively.

It should be noted that a virtual code rate, in contrast to an actually generated code rate detected by actually executing for compression processing, is obtained, without execution of actual compression processing, by estimating and computing a generated code rate which would have been obtained if the data had been subjected to compression processing from the beginning according to the scale factor value described above with computation of an actually generated code rate detected by a different scale factor value "Q" ("Q1" in Embodiment 1) using a ratio for each of the scale factor values.

As shown by the curve 201, compression is started according to a compression ratio for the scale factor value "Q1" at a point of time "a" and a generated code rate increases in association with elapse of compress in the me. Consequently, the curve 201 goes upward to the right.

Then, at a point of time "b" on the curve 201 after it crosses the straight line 202 for the MAX code rate, the curve 203 for the virtual code rate is started at a position 208 in which a generated code rate is less in the amount than that in a position 207 at which the curve 201 at the point of time "b" is present, namely a lower position on the graph in accordance with the scale factor value changed from "Q1" to "Q2".

The position 208 at which the curve 203 is started is a position in which a code rate is less in the amount than that in the position 207 at the point of time "b" of the curve 201 because the compression ratio for the scale factor value "Q2" is higher than that of the scale factor value "Q1".

Added to the virtual code rate at the point of time "b" is an increased rate obtained by compression thereafter, so that the virtual code rate increases only by the increased rate in association with elapse of compressing time. Consequently, the curve 203 also goes upward to the right.

Then, as the scale factor value is changed from "Q2" to "Q3" at a point of time "c" after the curve 203 crosses the straight line 202 for the MAX code rate, the curve 204 for the virtual code rate is started, like the curve 203, at a position 210 in which a code rate is less in the amount than that of a position 209 at which the curve 203 at the point of time "c" is present. Added to the virtual code rate at the current point of time is also the increased rate obtained by compression thereafter, so that the virtual code rate increases only by the increased rate in association with elapse of compressing time. Consequently, the curve 204 also goes upward to the right.

Similarly, a curve 205 is started at a point of time "d" by changing the scale factor value at the point of time "b" or at the point of time "c". Herein, a position 211 at which the curve 205 is started at the point of time "d" is a position in which the generated code rate exceeds the MAX code rate. In this case, the curve 205 does not cross the straight line 202, and the scale factor value is changed from "Q4" to "Q5" at a point of time "e" after a prespecified time has passed to obtain a curve 206.

Then, at a point of time "f" as an end point of time when compressing time for one image screen ends, the compression ratio for the scale factor value "Q5" is not sufficient for currently encoded one image screen because the curve 206 has already crossed the straight line 202, so that it is decided that the scale factor value "Q6" for the highest compression ratio is finally used. Then, compression is executed according to the compression ratio for the scale factor value "Q6" at a point of time "g".

Figure 3:
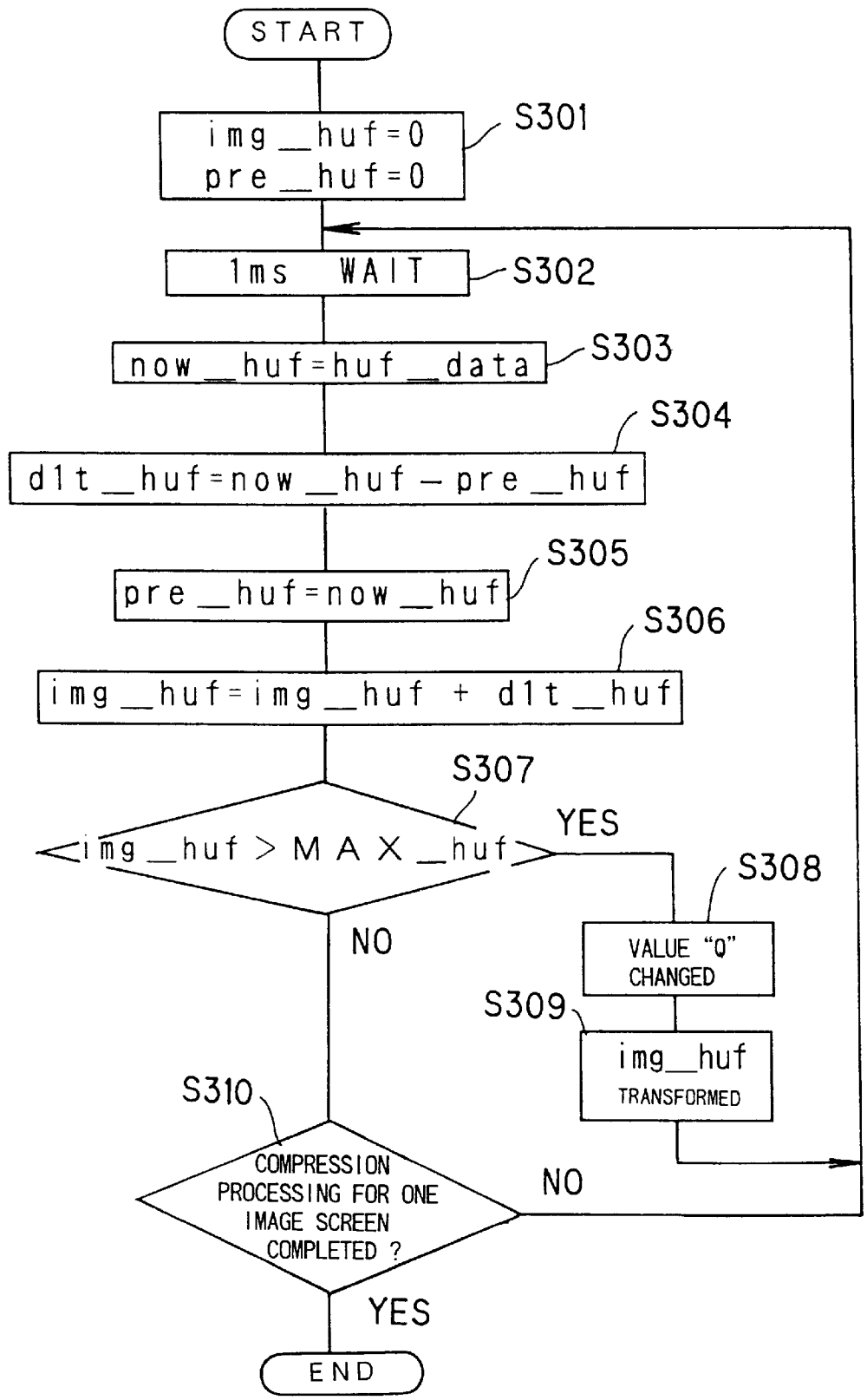
FIG. 3 is a flow chart showing a sequence of operations for image compression in the image processing apparatus according to Embodiment 1.

FIG. 3 is a flow chart showing a sequence of operations for image compression in the image processing apparatus according to Embodiment 1. In the flow chart, at first, the CPU 111 executes initialization for "img_huf" indicating data for a virtual code rate and for "pre_huf" indicating data for the code rate in the previous time (S301).

Namely, both of the "img_huf" and "pre_huf" are reset by making the "img_huf" to "img_huf=0" and the "pre_huf" to "pre_huf=0". It should be noted that description is made for the concrete contents of "img_huf" indicating data for a virtual code rate in step S306 described later as well as for the concrete contents of "pre_huf" indicating data for the code rate in the previous time in step S305 described later respectively.

Then, to compute a virtual code rate for each 1 ms in Embodiment 1, the CPU 111 waits (in a standby state) for processing operation herein by 1 ms (S302).

In step S302, the CPU 111 calls up, after waiting for the processing operation by 1 ms, a current code rate from the Huffman encoding section 109 (S303).

To be more specific, the CPU 111 calls up a current code rate by reading out data for "huf_data" indicating a generated code rate for image data Huffman-encoded in the Huffman encoding section 109 therefrom to receive the data and deciding the data for "huf_data" indicating the code rate as data for "now_huf" indicating the current code rate, namely, by making the data to "now_huf=huf_data".

Then, the CPU 111 computes a difference code rate which is an increased rate for the code rate from the point of time of computing the previous code rate to the current point of time (S304). More specifically, the CPU 111 computes an increased rate for the code rate by subtracting the previous code rate indicated in the data for "pre_huf" from the current code rate indicated in the data for "now_huf" and deciding the subtracted difference as data for "dlt_huf" indicating the difference code rate, namely by making the data to "dlt_huf=now_huf-pre_huf".

Furthermore, the CPU 111 decides the current code rate as the previous code rate (S305). More specifically, the CPU 111 decides the current code rate as the previous code rate by rewriting data for "pre_huf" indicating the previous code rate as data for "now_huf" indicating the current code rate, namely by making the data to "pre_huf=now_huf".

Accordingly, in a first processing, the previous code rate has been reset by initially setting up in step S301, so the "pre_huf" is zero ("pre_huf=0"). Also, from the fact described above, the difference code rate in the step S304 is equal to the current code rate in the first processing as well. Namely, the data is made to "dlt_huf=now_huf".

Then, the CPU 111 computes a virtual code rate (S306). A method of the computation is executed by deciding the data obtained by adding the difference code rate computed in step S304 to the virtual code rate computed in the previous time as the current virtual code rate.

To be more specific, the CPU 111 computes a virtual code rate by rewriting the data for "img_huf" indicating a virtual code rate as data adding thereto data for "dlt_huf" indicating a difference code rate, namely by making the data to "img_huf=img_huf+dlt_huf".

Accordingly, in the first processing in step S306, the "img_huf" indicating a virtual code rate has been reset by the initialization in step S301, so that the difference code rate becomes a virtual code rate as it is. Namely, the data is made to "img_huf=dlt_huf".

After a virtual code rate is computed, the CPU 111 compares the virtual code rate computed in the step S306 to the prespecified MAX_huf code rate and makes determination as to whether the virtual code rate exceeds the MAX_huf code rate in a data amount or not (S307). Herein, in a case where it is determined that the virtual code rate exceeds the MAX code rate in a data amount, namely in a case of "img_huf>MAX_huf", the CUP 111 changes the scale factor value "Q" to a scale factor value for a higher compression ratio (S308).

Changing of the scale factor value in this step is carried out step by step, as described above, using the relation between the compressing time and the generated code rate shown in FIG. 2, in the order of "Q1"→"Q2"→"Q3"→"Q4"→"Q5"→"Q6".

Then the CPU 111 also transforms the virtual code rate according to the scale factor value Q changed in step 308 (S309). To be more specific, the CPU 111 transforms the code rate based on a ratio between the scale factor value before being transformed to the current virtual code rate and the scale factor value transformed in the step S308.

The CPU 111 returns to step S302 after transforming the virtual code rate in step S309.

On the other hand, in the step S307, in a case where the virtual code rate does not exceed the MAX code rate in a data amount, namely in a case where the virtual code rate is equal to the MAX code rate or less in the data amount (in a case of "img_huf≦MAX_huf"), determination is made as to whether the compression processing for one image screen has been completed or not (S310).

Herein, in a case where it is determined that the compression processing for one image screen has not been completed and is still in the middle of operation, the CPU 111 returns to step S302. On the other hand, in a case where it is determined that the compression processing for one image screen has been completed, the CPU 111 ends the processing operation.

As described above, the CPU 111 repeats the processing steps under such conditions that a virtual code rate is not more than the MAX code rate and until the compression processing for the entire image of one image screen is ended.

With the image processing apparatus according to Embodiment 1 as described above, a scale factor value for generating a code rate analogous to the MAX code rate can be obtained for various types of image data according to operation for one compression processing by a single quantizing device.

At first, description is made for basic configuration of an image processing apparatus according to Embodiment 2. The basic configuration of the image processing apparatus according to Embodiment 2 is the same as that according to Embodiment 1 shown in FIG. 1, and the same reference numerals are assigned to the same components corresponding to those in Embodiment 1, so that description is made herein only for the different sections.

The CPU 111 controls a "Q_change" flag for determining whether the scale factor value "Q" has been changed or not. The CPU 111 sets, in a case where it is determined that the scale factor Q has been changed to the scale factor value for a higher compression ratio than the current scale factor value, the "Q_change" flag to "1". The CPU 111 also determines whether a high frequency element included in the object image is not more than a prespecified rate or not.

Figure 4:
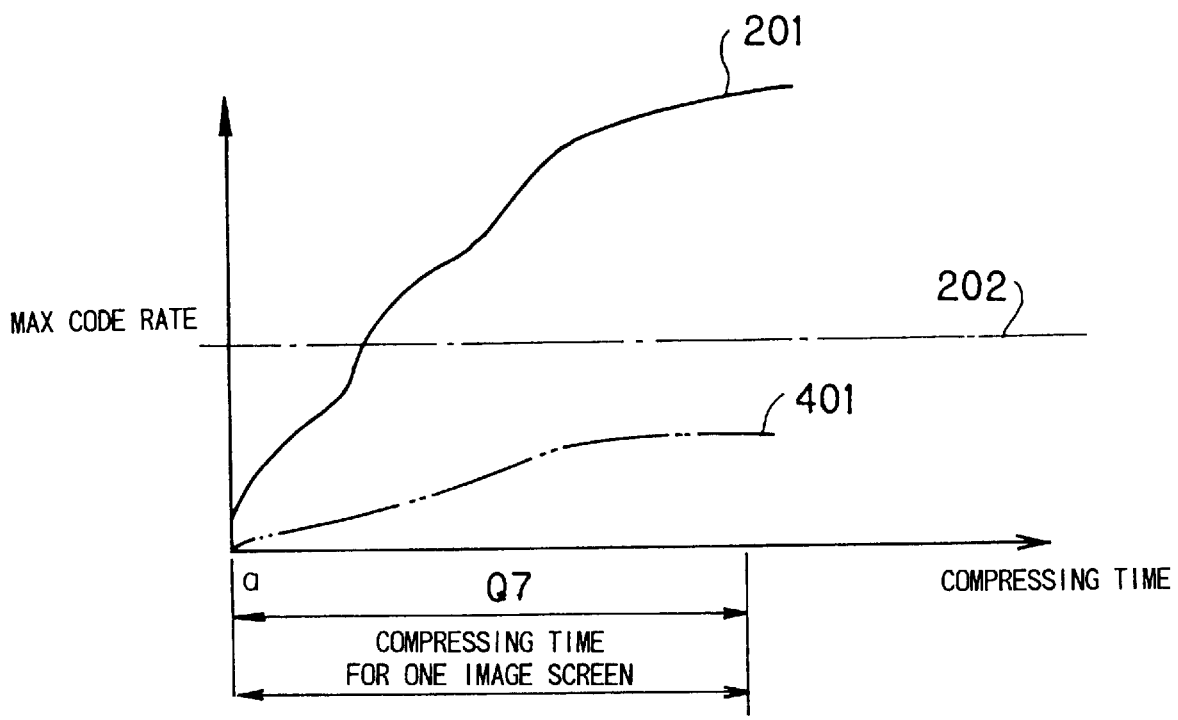
FIG. 4 is an explanatory view showing a relation between a compressing time required for image compression of one image screen and a generated code rate.

Next description is made for control of a generated code rate for data Huffman-encoded in the Huffman encoding section 109. FIG. 4 is an explanatory view showing a relation between a scale factor value "Q" for a compressing time required for image compression for one image screen and a generated code rate. It should be noted that the basic contents in Embodiment 2 is the same as that according to Embodiment 1 shown in FIG. 2, and the same reference numerals are assigned to the same contents corresponding to those in Embodiment 1, so that description is made herein only for the different sections.

In FIG. 4, a curve 401 indicated by a two-dot chain line indicates an actually generated code rate in a case where the data is encoded according to the compression ratio for the scale factor value "Q7". A scale factor value "Q7" is one for a further higher compression ratio than that of the scale factor value "Q6".

As shown by the curve 401, compression is started according to the compression ratio for the scale factor value "Q7" at a point of time "a" and a generated code rate increases in association with elapse of compressing time. Accordingly the curve 401 goes upward to the right.

However, the curve 401 does not cross the straight line 202 indicating the MAX code rate at all because the compression ratio for the scale factor value "Q7" is too high, which finally results in a state in which the data rate therein does not exceed the MAX code rate, namely a generated code rate is less in amounts. In this state, an image quality of the object image is degraded due to less amount of generated code rate although the processing for encoding into a fixed length target file is completed.

Figure 5:
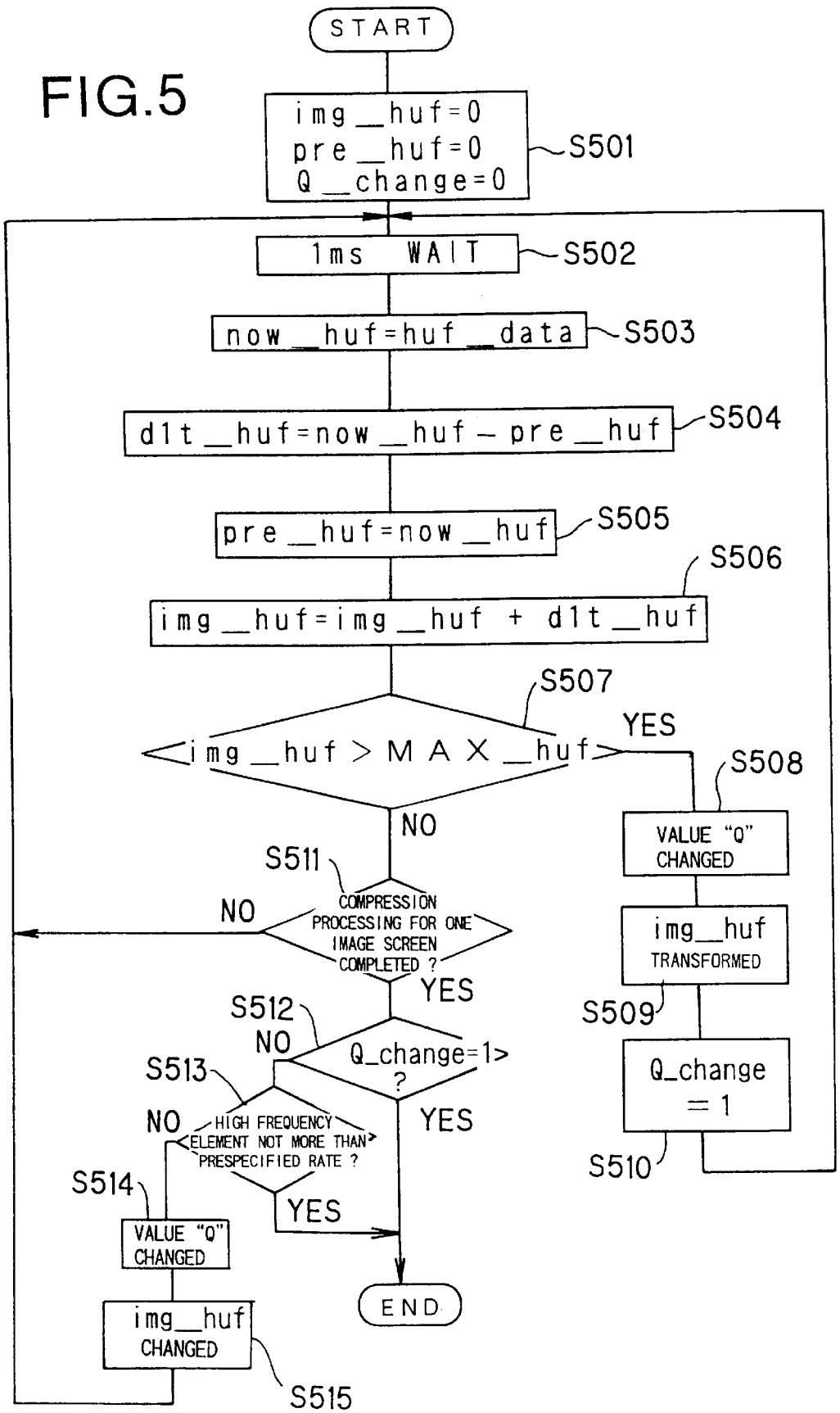
FIG. 5 is a flow chart showing a sequence of operations for image compression in an image processing apparatus according to Embodiment 2 of the present invention.

FIG. 5 is a flow chart showing a sequence of operations for image compression in the image processing apparatus according to Embodiment 2. In the flow chart, at first, the CPU 111 executes initialization for "img_huf" indicating data for a virtual code rate, for "pre_huf" indicating data for the previous code rate, and "Q_change" indicating a flag for determining whether "Q" as a scale factor value is changed or not respectively (S501). Namely, all of the "img_huf", "pre_huf", and "Q_change" is reset by making the data to "img_huf=0", to "pre_huf=0"and to "Q_change=0" respectively.

Then, to compute a virtual code rate for each 1 ms also in Embodiment 2, the CPU 111 waits (in a standby state) for processing operation herein by 1 ms (S502).

In step S502, the CPU 111 calls up, after waiting for the processing operation by 1 ms, a current code rate from the Huffman encoding section 109 (S503). To be more specific, the CPU 111 calls up the current code rate by reading out data for "huf_data" from the Huffman encoding section 109 to receive the data and deciding the data for "huf_data" indicating the code rate as data for "now_huf" indicating the current code rate, namely, by making the data to "now_huf=huf_data".

Then, the CPU 111 computes a difference code rate which is an increased rate for the code rate from the point of time of computing the previous code rate to the current point of time (S504). More specifically, the CPU 111 computes an increased rate for the code rate by subtracting the previous code rate indicated in the data for "pre_huf" from the current code rate indicated in the data for "now_huf" and deciding the subtracted difference as data for "dlt_huf" indicating the difference code rate, namely by making the data to "dlt_huf=now_huf-pre_huf".

Furthermore, the CPU 111 decides the current code rate as the previous code rate (S505). More specifically, the CPU 111 decides the current code rate as the previous code rate by rewriting data for "pre_huf" indicating the previous code rate as data for "now_huf" indicating the current code rate, namely by making the data to "pre_huf=now_huf".

Then, the CPU 111 computes a virtual code rate (S506). The computing method is executed by deciding the data obtained by adding the difference code rate computed in step S504 to the virtual code rate computed in the previous time as the current virtual code rate.

To be more specific, the CPU 111 computes a virtual code rate by rewriting the data for "img_huf" indicating a virtual code rate as data adding thereto data for "dlt_huf" indicating a difference code rate, namely by making the data to "img_huf=img_huf+dlt$_{13}$ hut".

After the computation of the virtual code rate, the CPU 111 compares the virtual code rate computed in the step S506 to the prespecified MAX_huf code rate and makes determination as to whether the virtual code rate exceeds the MAX_huf code rate in a data amount or not (S507). Herein, in a case where it is determined that the virtual code rate exceeds the MAX code rate in a data amount, namely in a case of "img_huf>MAX_huf", the CUP 111 changes the scale factor value "Q" to a scale factor value for a higher compression ratio (S508).

Then the CPU 111 also transforms the virtual code rate according to the scale factor value Q changed in step 508 (S509).

The CPU 111 sets the "Q_change" flag to "1" after the virtual code rate is transformed in step S509 (S510). Namely in this step, a state of the "Q_change" flag is always kept to be "Q_change=1" regardless of whether it is "Q_change=0" or "Q_change=1", then the CPU 111 returns to step S502.

On the other hand, in the step S507, in a case where the virtual code rate does not exceed the MAX_huf code rate in a data amount, namely in a case where the virtual code rate is equal to the MAX_huf code rate or less in the data amount (in a case of "img_huf≦MAX_huf"), determination is made as to whether compression processing for one image screen has been completed or not (S511). Herein, in a case where it is determined that the compression processing for one image screen has not been completed and is still in the middle of operation, the CPU 111 returns to step S502.

While in the step S511, in a case where it is determined that the compression processing for one image screen has been completed, the CPU 111 determines whether the "Q_change" flag is set to be "1" ("Q_change=1") or not (S512). Herein, in a case where it is determined that the "Q_change" flag is "1" ("Q_change=1"), determination can be made that the scale factor value has already been changed to the scale factor value for a higher compression ratio at least once, so that the CPU 111 ends the processing operation.

In the step S512, in a case where it is determined that the "Q_change" flag is not "1" ("Q_change≠1"), namely in a case where it is "Q_change=0", determination can be made that the scale factor value has not been changed to the scale factor value for a higher compression ratio, so that the CPU 111 makes determination as to whether a high frequency element included in the object image is not more than the prespecified rate or not (S513). The fact that a high frequency element is not more than the prespecified rate indicates a case where the object image is flat, such as the entire surface of an object image with white or the like.

In the step S513, in a case where it is determined that the high frequency element is not more than the prespecified rate, it is not required to change the scale factor value "Q" to the scale factor value for a higher compression ratio, so that the CPU 111 terminates the processing operation. On the other hand, in a case where it is determined that the high frequency element is not less than the prespecified rate, the CPU 111 changes the scale factor value "Q" to a scale factor value for a lower compression ratio so that the virtual code rate exceeds the MAX code rate (S514).

Then, the CPU 111 also transforms the virtual code rate based on the scale factor value Q changed in step S514 (S515), and then returns to step S502.

As described above, the CPU 111 repeats the processing step under the conditions that the virtual code rate is not more than the MAX code rate and at the same time until the compression processing for the entire image screen in one image screen is ended. In a case where the virtual code rate has not exceeded the MAX code rate even once, the CPU 111 changes the scale factor value "Q" so that the virtual code rate exceeds the MAX code rate at least once.

As described above, with the image processing apparatus according to Embodiment 2, a scale factor value is programmed to change to a scale factor value for a higher compression ratio at least once, which makes it possible to prevent a generated code rate from being too small in amounts as compared to the MAX code rate.

Figure 6:
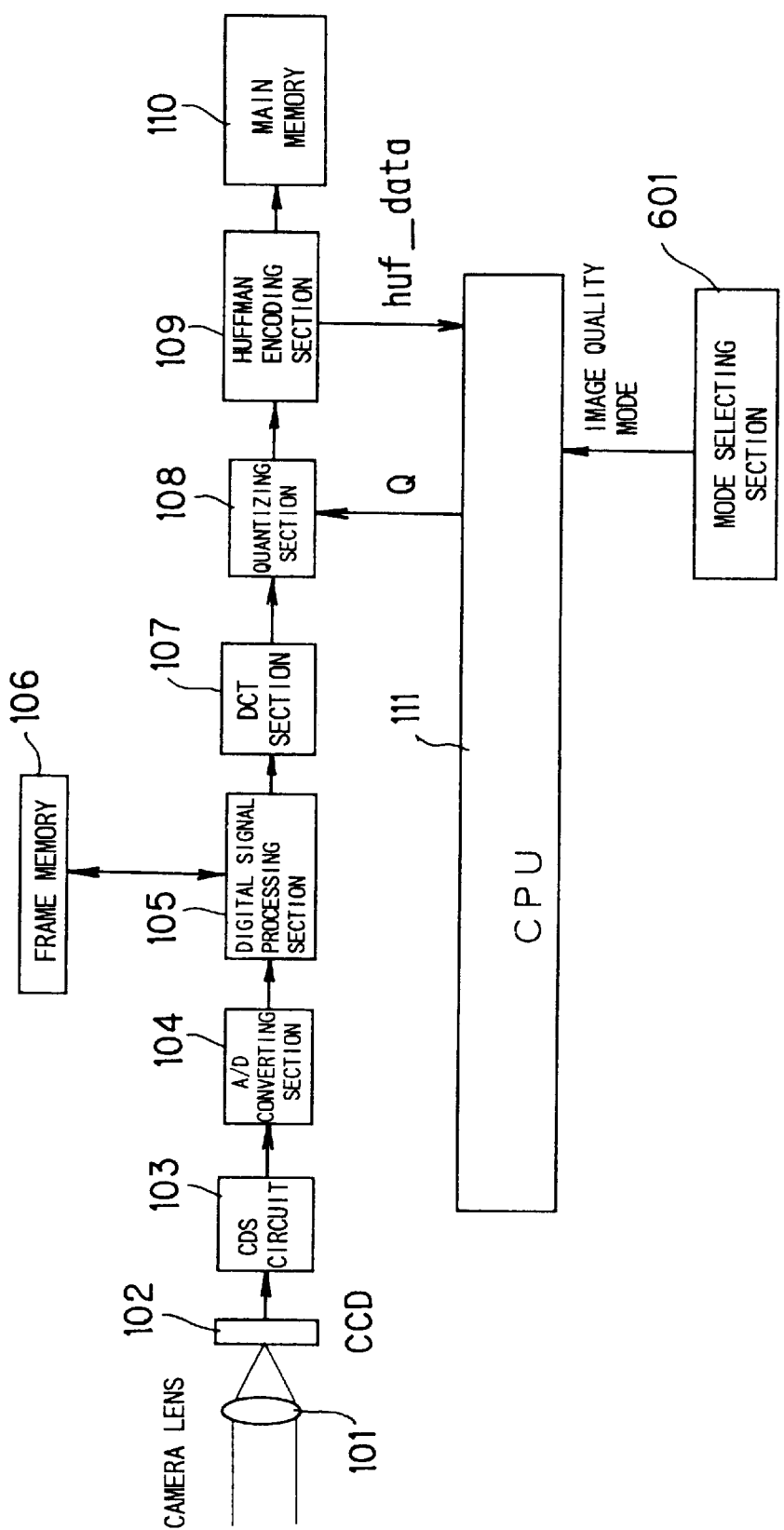
FIG. 6 is a block diagram showing basic configuration of an image processing apparatus according to Embodiment 3 of the present invention.

At first, description is made for basic configuration of an image processing apparatus according to Embodiment 3. FIG. 6 is a block diagram showing basic configuration of the image processing apparatus according to Embodiment 3. The basic configuration of the image processing apparatus according to Embodiment 3 is the same as that according to Embodiment 1 shown in FIG. 1, and the same reference numerals are assigned to the same components corresponding to those in Embodiment 1, so that description is made herein only for the different sections.

A mode selecting section 601 is a section for the operator to select any image quality mode for an object image from a plurality types of image quality mode, and, for instance, the selection is realized by operating a mode selecting switch or the like. In the present embodiment, the operator can select two modes of "a high image quality mode" for recording an object image in high quality and "a low image quality mode" for recording an object image in low quality other than "a normal mode". Data on any image quality mode selected by the mode selecting section 601 is transmitted to the CPU 111.

The CPU 111 receives the data on the image quality mode transmitted from the mode selecting section 601 and changes the MAX code rate according to the data. For instance, in a case where the data on the image quality mode is the "high image quality mode", the CPU 111 changes the MAX code data to make it higher as compared to the data in the "normal mode", and reversely, in a case where the data on the image quality mode is the "low image quality mode", the CPU 111 changes the MAX code rate so that it is made lower as compared to the data in the "normal mode".

With this change, the umber of remaining sheets of image to be photographed varies, so that the difference is displayed by a display section which is not shown herein. Namely, if the "high image quality mode" is received, the number of the remaining sheets of image which can be photographed becomes less, while, if the "low image equality mode" is received, the number of remaining sheets of image which can be photographed increases.

The CPU 111 changes a change rate for the scale factor value "Q" in response to the changed MAX code rate. In a case where the "low image quality mode" is selected and the MAX code rate becomes less in the amount, the data itself after the quantization (compression) comprises only a low frequency element, so that, if the scale factor value "Q" is changed so that it is made to a scale factor value for a compression ratio higher by a %, and as a result of correspondence thereto, the virtual code rate becomes less by a %.

However, in a case where the "high image quality mode" is selected and the MAX code rate becomes more in its amount and, for instance, if the scale factor value "Q" is changed to a scale factor value for a compression ratio higher by a % with the high frequency element distributed in the data itself after the quantization (compression), the virtual code rate becomes less by (a+α)%. Accordingly, the scale factor value "Q" is set taking into considerations a correlation between the scale factor value "Q" for the MAX code rate and the virtual code rate.

Namely, the CPU 111 changes a change rate according to which the scale factor value "Q" is changed when the scale factor value "Q" is set according to an encoded rate for the Huffman-encoded data. For instance, in a case where the MAX code rate is made higher by selection of the "high image quality mode", the scale factor value "Q" shown in Embodiment 1 can be changed in the change rate like "Q1"→"Q3"→"Q5", and the process for deciding the scale factor value "Q" can be reduced in accordance with the changed rate, so that high-speed processing can be realized.

As described above, the CPU 111 changes not only a MAX code rate but also a change rate for a scale factor value "Q" in accordance with the change of the MAX code rate.

In the operation of the image processing apparatus according to Embodiment 3, the operation of the image compression after the MAX code rate and the scale factor value "Q" are set is the same as that according to Embodiment 1 or Embodiment 2, so that description thereof is omitted herein.

With the image processing apparatus according to Embodiment 3 as described above, a MAX code rate can be changed by selection of any of image quality modes, which can make the rate to any generated code rate corresponding to the selected image quality mode. A change rate of the scale factor value "Q" is changed according to the change of the MAX code rate, which makes it possible to execute processing for encoding with optimal fixed length to a different image quality mode.

As described above, in the image processing method according to the present invention, image data is compressed using a compression ratio value for changing a compression ratio, a compressed code rate in data compression is detected, and a condition for a compression ratio value is changed according to the detected code ratio value even during compression of one image screen, so that an optimal compression ratio value can be obtained by compressing the entire image screen at one time, and high-speed processing for encoding into a fixed length target file, can be carried out, which makes it possible to reduce a time required for the processing for encoding into a fixed length target file.

In the image processing method according to the present invention, the compression ratio value is made higher in a case where the detected compressed code rate exceeds an upper limit code rate indicating a preset upper limit of a code rate in one image, so that a compression ratio value can be set so that the value is analogous to the upper limit of a code rate, which makes it possible to execute processing for encoding into a fixed length target file with higher-precision.

In the image processing apparatus according to the present invention, the data compressing means compresses image data using a compression ratio value for changing a compression ratio, the compressed code rate detecting means detects a compressed code rate in data compression, and the condition changing means changes a condition for a compression ratio value according to the detected code rate value even during compression of one image screen, so that an optimal compression ratio value can be obtained by compressing the entire image screen at one time in the single encoding device, and high-speed processing for encoding into a fixed length target file can be carried out, which makes it possible to reduce a time required for the processing for encoding into a fixed length target file as well as to reduce cost of the entire apparatus.

In the image processing apparatus according to the present invention, a detected code rate is compared to an upper limit code rate indicating an upper limit of a code rate in one image, and the compression ratio value is changed so that the code rate detected at least once exceeds the upper limit code rate, so that, in the processing for encoding into a fixed length target file, a generated code rate is set so that it is not too small in amounts as compared to the upper limit code rate, which makes it possible to prevent the quality of an object image from degradation.

In the image processing apparatus according to the present invention, the first time compression ratio is set so that it exceeds the upper limit code rate and a condition for the second time compression ratio is changed so that the compression ratio is made higher to suppress a code rate, so that, in the processing for encoding with fixed length target file, a generated code rate is set so that it is not too small in amounts as compared to the upper limit code rate, which makes it possible to prevent the quality of an object image from degradation.

In the image processing apparatus according to the present invention, in a case where the second time compression ratio is still over the upper limit code rate, the third time compression ratio is further made higher to suppress a code rate, so that, in the processing for encoding with fixed length, a generated code rate is set so that it is not too small in amounts as compared to the upper limit code rate, which makes it possible to prevent the quality of an object image from degradation.

In the image processing apparatus according to the present invention, in a case where the second time compression ratio is not more than the upper limit code rate, the second time compression ratio is decided as a compression ratio for image data, so that, in the processing for encoding into a fixed length target file, a generated code rate is set so that it is not too small in amounts as compared to the upper limit code rate, which makes it possible to prevent the quality of an object image from degradation.

In the image processing apparatus according to the present invention, the compression ratio value is changed so that it is made higher in a case where the detected code rate exceeds an upper limit code rate indicating a preset upper limit of a code rate in one image, so that the compression ratio can be set so that a code rate will be more analogous to the upper limit code rate, which makes it possible to execute processing for encoding into a fixed length target file with higher precision.

In the image processing apparatus according to the present invention, further, a change rate in changing the compression ratio value is controlled according to the changed upper limit code rate, so that a generated code rate corresponding to any desired image quality can easily be obtained. The processing for optional encoding into a fixed length target file can also be carried out to a different image quality mode.

In the image processing method according to the present invention, image data is transformed to a frequency conversion coefficient using a discrete cosine transform coefficient, the transformed frequency conversion coefficient is quantized using a quantization coefficient indicating weighing in quantization, quantized data is encoded, a code rate for encoded data is detected by a prespecified time interval during the processing for encoding, and the quantization coefficient is changed during execution of the processing for encoding according to the detected code rate, so that an optimal quantization coefficient can be obtained by compressing an entire image screen at one time, and high-speed processing for encoding into a fixed length target file can be executed, which makes it possible to reduce a time required for the processing for encoding into a fixed length target file.

In the image processing method according to the present invention, the quantization coefficient is changed to a quantization coefficient for a higher compression ratio in a case where the detected code rate exceeds an upper limit code rate indicating a preset upper limit of a code rate in one image, so that a quantization ratio can be set so that a code rate will be more analogous to the upper limit code rate, which makes it possible to execute processing for encoding into a fixed length target file with higher precision.

In the image processing apparatus according to the present invention, the discrete cosine transform (DCT) means transforms image data to a frequency conversion coefficient using a discrete cosine transform coefficient, the quantizing means quantizes a frequency conversion coefficient transformed by the discrete cosine transform means using a quantization coefficient indicating weighing in quantization, the encoding means encodes data quantized by the quantizing means, the code rate detecting means detects a code rate for encoded data by a prespecified time interval during execution of the processing for encoding the quantized data by the encoding means, and the quantization coefficient changing means changes the quantization coefficient during processing for encoding according to the code rate detected by the code rate detecting means, so that an optimal quantization coefficient can be obtained by compressing an entire image screen at one time in a single encoding device, and high-speed processing for encoding into a fixed length target file can be executed, which makes it possible to reduce a time required for the processing for encoding into a fixed length target file as well as to reduce cost of the entire apparatus.

In the image processing apparatus according to the present invention, the quantization coefficient changing means compares the code rate detected by the code rate detecting means to an upper limit code rate and changes the quantization coefficient so that the code rate detected by the code rate detecting means at least once exceeds the upper limit code rate, so that, in the processing for encoding into a fixed length target file, a generated code rate is set so that it is not too small in amounts as compared to the upper limit code rate, which makes it possible to prevent the quality of an object image from degradation.

In the image processing apparatus according to the present invention, the quantization coefficient changing means changes the quantization coefficient to that for a higher compression ratio in a case where the code rate detected by the code rate detecting means exceeds an upper limit code rate indicating a preset upper limit of a code rate in one image, so that a quantization ratio can be set so that a code rate will be more analogous to the upper limit code rate, which makes it possible to execute processing for encoding into a fixed length target file with higher precision.

In the image processing apparatus according to the present invention, the upper limit code rate changing means changes the upper limit code rate, the quantization coefficient changing means controls a change rate in changing the quantization coefficient according to the upper limit code rate changed by the upper limit code rate changing means, so that a generated code rate corresponding to any desired image quality can easily be obtained. The processing for optional encoding into a fixed length target file can also be carried out to a different image quality mode.

This application is based on Japanese patent applications No. HEI 8-043642 and No. HEI 9-021708 filed in the Japanese Patent Office on Feb. 29, 1996 and Feb. 4, 1997, respectively, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image processing method comprising:
   a) compressing image data up to a completion point using an actual scale factor so that the entire image data is compressed using the actual scale factor;
   b) during step (a), detecting an actual compressed code rate generated in said compressing step;
   c) during step (a), comparing the detected actual compressed code rate to a predetermined upper limit;
   d) during step (a), determining a virtual scale factor when the detected actual compressed code rate is determined in said comparing step to exceed the predetermined upper limit;
   e) during step (a), determining by estimation a virtual compressed code rate based on the virtual scale factor and the actual compressed code rate detected after said comparing step determines that the actual compressed code rate exceeds said predetermined upper limit; wherein the virtual compressed code rate is estimated without recompressing any portion of the image data;
   f) during step (a), comparing the virtual compressed code rate with said predetermined upper limit;
   g) during step (a), modifying said virtual scale factor if the virtual compressed code rate exceeds said predetermined upper limit;
   h) during step (a), repeating steps (e)–(g) each time the virtual code rate is determined to exceed the predetermined upper limit and until the completion point in step (a);
   i) determining an optimum scale factor based on the virtual scale factor being used at the completion point in step (a); and j) recompressing the image data using the optimum scale factor.

2. An image processing method according to claim 1, wherein compressing steps (a) and (j) include:
   a transforming step in which the image data is transformed to a frequency conversion coefficient using a discrete cosine transform coefficient;
   a quantizing step in which the frequency conversion coefficient in said transforming step is quantized using the actual scale factor in step (a) and the optimum scale factor in step (j); and
   an encoding step in which the data quantized in said quantizing step is encoded.

3. An image processing apparatus comprising:
   a first data compressing mechanism configured to compress image data using an actual scale factor;
   an actual compressed code rate detecting mechanism configured to detect an actual compressed code rate generated in said first data compressing mechanism;
   an actual compressed code rate comparing mechanism configured to compare the actual compressed code rate to a predetermined upper limit;
   a virtual scale factor determining mechanism configured to determine a virtual scale factor when the detected actual compressed code rate is determined to exceed the predetermined upper limit;
   a virtual compressed code rate estimating mechanism configured to estimate a virtual compressed code rate based on the virtual scale factor and the actual compressed code rate detected after the determination by said actual compressed code rate comparing mechanism that the actual compressed code rate exceeds said predetermined upper limit;
   a virtual compressed code rate comparing mechanism configured to compare the virtual compressed code rate with said predetermined upper limit;
   a virtual scale factor modifying mechanism configured to modify said virtual scale factor if the virtual compressed code rate is determined by said virtual compressed code rate comparing mechanism to exceed said predetermined upper limit;
   an optimum scale factor determining mechanism configured to determine an optimum scale factor based on the virtual scale factor used at completion of the image compression by said first data compressing mechanism; and
   a second data compressing mechanism configured to compress the image data using the optimum scale factor.

4. An image processing apparatus according to claim 3, further comprising an upper limit changing mechanism configured to change the predetermined upper limit.

5. An image processing apparatus according to claim 3, further comprising a second virtual scale factor determining mechanism configured to determine a virtual scale factor if the actual compressed code rate is less than the predetermined upper limit at completion of the image compression by said first data compressing mechanism.

6. An image processing apparatus according to claim 3, wherein the first and second data compressing mechanisms include:
   a discrete cosine transform means for transforming the image to a frequency conversion coefficient using a discrete cosine conversion coefficient;
   a quantizing means for quantizing the frequency conversion coefficient using the actual scale factor in the first data compressing mechanism and the optimum scale factor in the second data compressing mechanism;
   an encoding means for encoding data quantized by said quantizing means.

7. An image processing apparatus comprising:
   a first data compressing means for compressing image data using an actual scale factor;
   an actual compressed code rate detecting means for detecting an actual compressed code rate generated in said first data compressing means;
   an actual compressed code rate comparing means for comparing the actual compressed code rate to a predetermined upper limit;
   a virtual scale factor determining means for determining a virtual scale factor when the detected actual compressed code rate is determined to exceed the predetermined upper limit;
   a virtual compressed code rate estimating means for estimating a virtual compressed code rate based on the virtual scale factor and the actual compressed code rate detected after the determination by said actual compressed code rate comparing means that the actual compressed code rate exceeds said predetermined upper limit;
   a virtual compressed code rate comparing means for comparing the virtual compressed code rate with said predetermined upper limit;
   a virtual scale factor modifying means for modifying said virtual scale factor if the virtual compressed code rate is determined by said virtual compresed code rate comparing means to exceed said predetermined upper limit;
   an optimum scale factor determining means for determining an optimum scale factor based on the virtual scale factor used at completion of the image compression by said first data compressing means; and
   a second data compressing means for compressing the image data using the optimum scale factor.

8. An image processing apparatus according to claim 7, further comprising an upper limit changing means for changing the predetermined upper limit.

9. An image processing apparatus according to claim 7, further comprising a second virtual scale factor determining means for determining a virtual scale factor if the actual compressed code rate is less than the predetermined upper limit at completion of the image compression by said first data compressing means.

* * * * *